Figure 1:
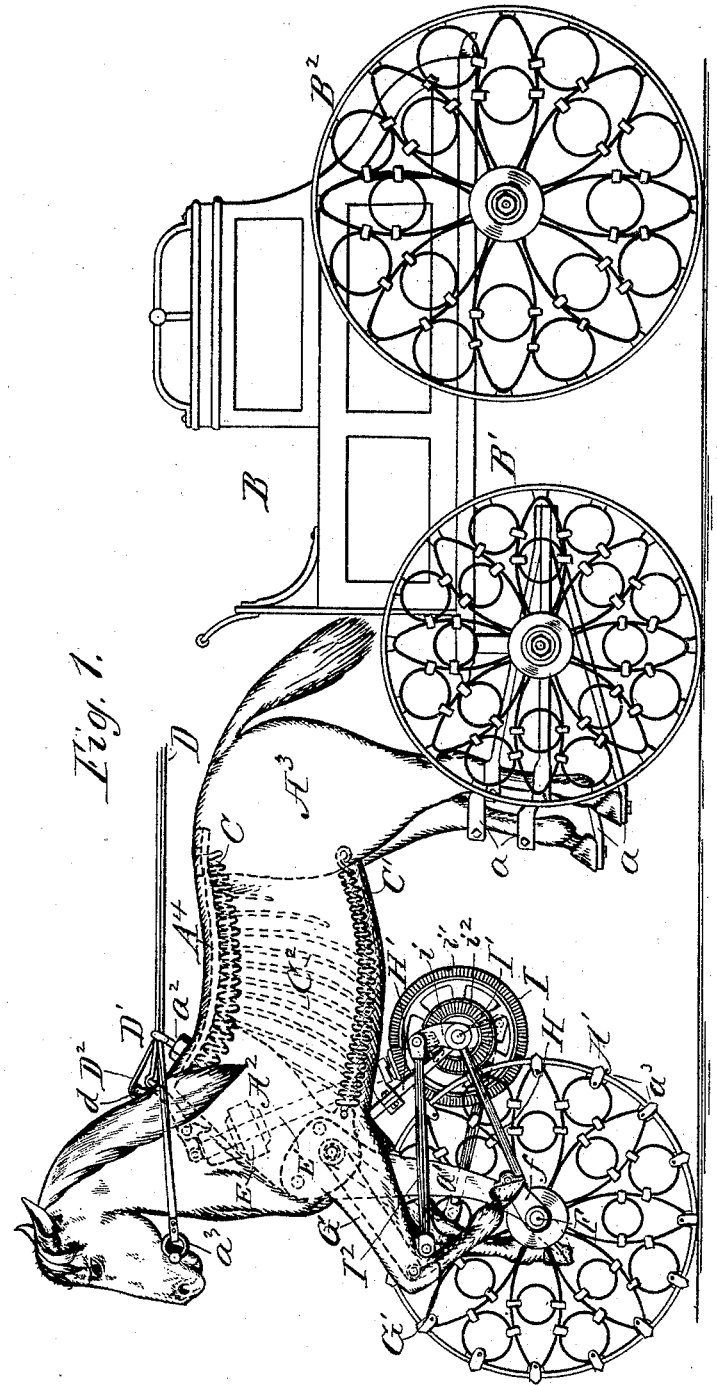

(No Model.) 2 Sheets—Sheet 1.

T. J. THORP.
SELF PROPELLING VEHICLE.

No. 495,531. Patented Apr. 18, 1893.

Witnesses:
Chas. E. Burnap
Cyrus Burnap

Inventor
Thomas J. Thorp.
By his Attorneys
Dayton, Poole & Brown (No Model.) 2 Sheets—Sheet 2.
T. J. THORP.
SELF PROPELLING VEHICLE.
No. 495,531. Patented Apr. 18, 1893.
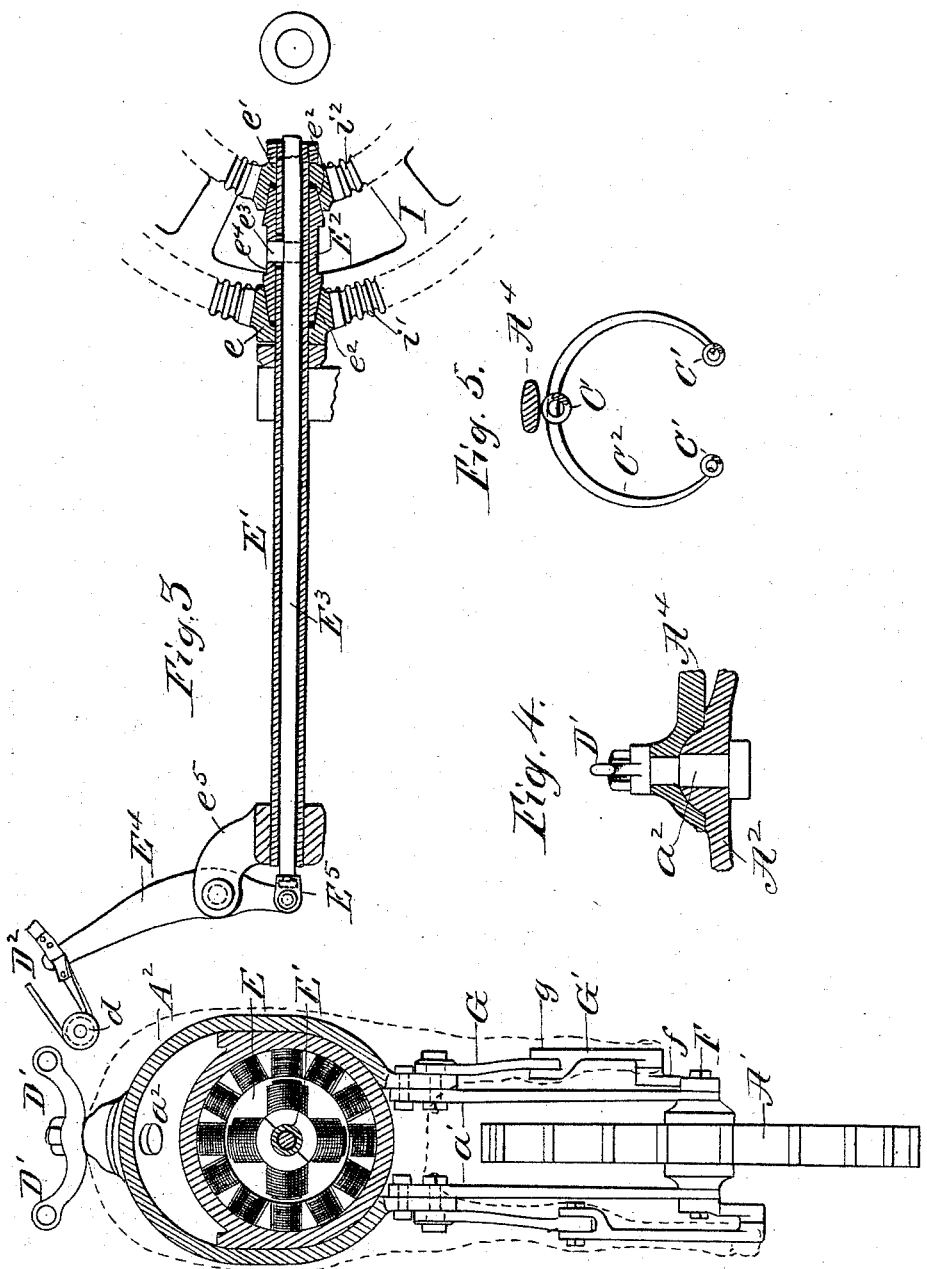
Witnesses:
Chas. C. Burnap
Cyrus Burnap
Inventor:
Thomas J. Thorp.
By his Attorneys
Dayton, Poole & Brown

UNITED STATES PATENT OFFICE.

THOMAS J. THORP, OF CHICAGO, ILLINOIS, ASSIGNOR OF THREE-FOURTHS TO GEORGE E. DAWSON, JAMES C. THOMAS, AND C. S. WELLS, OF SAME PLACE.

SELF-PROPELLING VEHICLE.

SPECIFICATION forming part of Letters Patent No. 495,531, dated April 18, 1893.

Application filed February 2, 1892. Serial No. 420,110. (No model.)

*To all whom it may concern:*

Be it known that I, THOMAS J. THORP, of Chicago, in the county of Cook and State of Illinois, have invented certain new and useful Improvements in Self-Propelling Vehicles; and I do hereby declare that the following is a full, clear, and exact description thereof, reference being had to the accompanying drawings, and to the letters of reference marked thereon, which form a part of this specification.

This invention has reference to road vehicles propelled by electric or other power carried by the structure itself, and it consists in the matters hereinafter set forth and pointed out in the claims.

In the drawings which illustrate one form of application of my invention: Figure 1 is a side elevation of my improved vehicle having the motive power mounted on the semblance of a horse which is supported in part by a wheel independent of those which uphold the passenger carriage. Fig. 2 is a rear view of the toggle system applied to the propelling wheel beneath the horse, the body of the horse being shown in transverse section as containing a form of electric motor. Fig. 3 is an enlarged detail, in section, of the shaft by which power is transmitted from the motor to the ground wheel and by which the speed of the vehicle may be varied. Fig. 4 is a vertical section of the pivotal connection of the backbone with shoulder-frame of the animal semblance. Fig. 5 is a transverse vertical section of the body-portion of the animal semblance, showing two of the ribs and also the flexing-springs.

A designates a structure which is formed in the semblance of a horse or other draft animal and B a passenger carriage or vehicle proper connected therewith. Beneath the carriage B are two pairs of wheels B' and B², the front pair B' being mounted upon a centrally pivoted axle so as to swing laterally after the usual manner of the front axles of four wheeled vehicles generally. The rear portion of the animal is suitably connected with the front axle to swing the latter when the animal is turned to either side, such connection being here shown in the form of bars $a\,a$ attached to the hind legs and hoofs of the animal. The front portion of the animal is supported upon a single ground wheel A' arranged between the animal's fore legs and connected with the shoulder frame of the animal by means of standards or arms $a'$, one on each side of said wheel, in the lower ends of which arms the axle of the wheel is journaled said axle being rigid with the wheel A'. The semblance of a horse or other animal is composed of two rigid and flexibly connected portions. The front portion includes the shoulders, neck and head, designated as a whole by the letter A², and the rear portion consists of the rump and hind legs, marked, as a whole, A³. A "backbone" A⁴ is rigidly connected with the rear part A³ and is pivotally connected by a substantially vertical pivot $a^2$ with the shoulder frame A², as illustrated in detail in Fig. 4. The front and rear frame portions A² A³ are also further connected by longitudinally arranged springs C C', here shown to be three in number, one of them, C, being placed centrally beneath the backbone A⁴ and the two others, C' C', being arranged along the flanks of the body, as illustrated in Figs. 1 and 5. These springs normally hold the parts of the body of the animal in straight alignment. Suitable ribs C², preferably connected with the springs C C', as shown in Fig. 5, serve to preserve the contour of the body which, with the other portions of the frame of the animal, is suitably covered by an outside casing which may be termed the "hide" of the animal. By the construction described the front portion of the frame of the animal may be swung from side to side with reference to the rear portion of its frame, the body generally having lateral flexure by means of the coiled longitudinal springs C C' and the pivotal connection A² which flexibly joins the backbone with the shoulder frame. By means, therefore, of the reins D D connected with opposite sides of the part A², in such manner as to obtain a leverage, as, for example, to rings $a^2$ or to levers or arms D', the rider, occupying the vehicle B, may swing the front of the animal from side to side and thus deflect the course of the wheel A' connected with said part A² of the frame, and thereby change the course of the vehicle.

A motor E is mounted within the shoulder frame of the horse and is here shown (Fig. 2) as being of the electric order and as mounted upon the upper part of, and rotating a shaft E' by which power is communicated to the driving wheel beneath said portion of the animal; this shaft extending obliquely upward and forward into the shoulder-frame of the animal. The hoofs or lower extremities of the front legs of the animal are attached to cranks $f$ projecting in opposite directions from the opposite ends of the axle F, which, as stated, is rigid with the wheel A'. The front legs of the animal consist essentially of toggles, each composed of the pivoted levers G G'. The lower ends of the members G' form the hoofs of the front legs and have pivotal connection with the cranks $f$ already described, while the upper ends of the members G are pivoted to the shoulder frame $A^2$. Back of the wheel A' and supported by arms H H' or otherwise from the wheel axle and shoulder frame, is mounted a vertical gear wheel I on a central, rigidly connected crank shaft I' which is journaled in the converging extremities of said arms H H' and is provided with opposite cranks $i$. To the extremities of these cranks are pivotally connected rods $I^2$, one on each side, which connect severally with the central joints $g$ of the toggle levers G G' forming the animal's front legs. The motor shaft E' extends obliquely upward and forward into the shoulder-frame $A^2$ of the animal, as before stated, and is provided with one or more beveled pinions engaging a circular rack on the wheel I, and by this means said wheel and its connected cranks $i$ are set in motion, operating the toggles which form the legs of the animal, and, acting through both of said cranks to impart rotary motion to the ground wheel A' and thus to give movement to the vehicle. One of the legs or toggles is therefore being forcibly flexed at the same time that the other is being forcibly straightened, so that one of the cranks on the wheel A' is being drawn upward at the same time that the other is being pushed downward.

As a particular and preferable construction of the devices for communicating power from the motor shaft to the leg toggles or driving wheel cranks, I have shown and claim the wheel I as having two circular racks of unequal diameter and the motor shaft E' as being provided with two loose pinions which are in continuous engagement with these several racks. A shiftable tubular clutch surrounds the lower part of the motor shaft, and is interposed between these pinions by which one may be operatively released from the power shaft while the other is operatively connected therewith, so that, when desired, the outer rack and pinion on the wheel I may be employed as the media for transmitting motion and higher power to the crank-shaft, giving a relatively slow speed, and at other times the inner pinion and rack may be brought into action to give a higher speed with less power to said crank shaft. This construction is illustrated in detail in Fig. 3, $i'$ being the outer and $i^2$ the inner rack of the wheel I, and $e$ the outer and $e'$ the inner pinion on the hollow shaft E.

$E^2$ is the intermediate clutch. The pinions $e\ e'$ are loose upon the shaft E' and are provided on their proximate faces with conical recesses $e^2\ e^2$. Between the pinions is placed the double conical clutch $E^2$ having its conical ends fitted to these recesses and adapted in length to be disengaged with one of said pinions while it is engaged with the other. For the purpose of moving this clutch a rod $E^3$ is fitted to slide within the hollow motor shaft E' and is provided with a laterally projecting pin $e^3$ which projects into engagement with the clutch $E^2$ through a slot $e^4$ formed through one side of the motor shaft E'. Longitudinal movement of the rod $E^3$ will obviously carry the clutch from engagement with one of the pinions $e\ e'$ to the engagement with the other and thus cause the desired variation of the speed and power imparted through the motor shaft E' to the wheel I. For the purpose of giving such a longitudinal movement to the rod $E^3$ a lever $E^4$ is mounted in a fixed bracket $e^5$ rigidly supported in any suitable manner from the shoulder frame portion of the animal, and at the inner end of said lever is pivoted a head $E^5$ having a pivoted connection with the rod $E^3$. The opposite end of the lever is connected with a double strap $D^2$ one part of which passes directly back to the driver and the other of which is trained over a fixed pulley $d$ placed in advance of the end of the lever, as illustrated in Fig. 1, so that the rider in the vehicle B, having the straps in reach, may pull upon one to throw the shaft $E^3$ inward and upon the other to throw it outward and thus change the engagements of the gear. The wheel A' is preferably provided with peripheral projections $a^3$, shown as transverse ribs, and said wheel is also preferably elastic, as indicated.

The detachment of the vehicle body from the front wheels will manifestly leave a three wheeled vehicle upon which one may ride as upon horseback, or, the form of what here represents a horse being changed, the latter may constitute a suitable receptacle in which one or more passengers may be seated as in an ordinary carriage. In other words, it is not essential to the spirit of the invention that the vehicle be constructed in the particular form shown, and the parts here marked $A^2$ and $A^3$ may have any form suited to the appropriate mechanical connections. So also for the general purposes of my invention the rods $I^2$ may connect directly with the cranks of the axle of the wheel A' by the usual arrangements of connected double cranks for this purpose.

I claim as my invention—

1. A self-propelling vehicle, comprising a main structure or frame composed of a rear portion and a front portion vertically pivoted to the rear portion, a plurality of springs flexibly connecting the front and rear portions of the said main structure and located at opposite points from the median line of said structure, wheels located beneath the structure, a motor carried by the main structure and geared to the said wheel or wheels, and means whereby a rider may flex the two portions of the main structure laterally against the springs, substantially as set forth.

2. A self-propelling vehicle, comprising a main structure or frame composed of a rear portion and a front portion pivoted to the rear portion and having a double-cranked axle, a motor carried by the main structure, toggles connecting the front of the main structure to the cranks of said axle, and also operatively connected to the motor and serving to transmit the power of the motor to the axle, substantially as set forth.

3. A self-propelling vehicle, comprising a main-frame mounted upon wheels, and a motor carried by said main-frame and operatively connected to one or more of said wheels, an intermediate gear-wheel forming part of the connecting-mechanism and provided with two concentric gear-racks, a tubular shaft also forming a part of the connecting-mechanism and provided with two loose external gear-pinions for engaging the concentric racks, and provided also with an external shiftable clutch for engaging and disengaging the gear-pinions, and thus varying the propulsion, speed and power, substantially as set forth.

4. A self-propelling vehicle, comprising a wheel-mounted vehicle carrying a motor for effecting the propulsion of the vehicle, a gear-wheel, for transmitting power from the motor, provided with two concentric gear-racks, a tubular shaft also forming a part of the connecting-mechanism and carrying two external loose gear-pinions for engaging the racks, a shiftable clutch embracing the tubular shaft and arranged to engage and disengage the pinions, and a rod mounted within the tubular shaft and longitudinally movable therein, and a radial projection carried by the rod and working through an opening in the shaft and also engaging the clutch, substantially as set forth.

5. A self-propelling vehicle, comprising a main structure or frame composed of a front and rear portion pivoted vertically together, carrying-wheels mounted beneath said portions, a motor carried by the main structure and appropriately connected to rotate the wheels for propelling the structure, a driving mechanism, interposed between the motor and the driving-wheels and comprising a gear-wheel having two concentric gear-racks, a tubular shaft extending within the main structure and carrying externally two loose gear-pinions for engaging said gear-racks, an external shiftable clutch carried by the shaft and serving to engage and disengage the pinions, a rod mounted and movable longitudinally within the shaft and serving to shift the clutch, a lever carried by one end of the rod, a pulley located in front of the free end of the lever, and two straps for moving the rod, connected to the rod and leading the one directly backward from the rod and the other forward from the rod and around the pulley and thence backward therefrom, substantially as set forth.

6. A self-propelling vehicle, comprising a main structure or frame formed in the semblance of an animal and composed of two portions one of which constitutes the front part of the animal's body and the other of which constitutes the middle and rear portions of said body, the front end of the rear portion being pivoted vertically to the rear part of the front portion, a spring coincident with the median line of the main structure and a number of springs located at opposite points from the median line of the main structure and so connecting the front and rear portions of the main structure as to retain said portions normally in longitudinal alignment, a back-bone for the middle portion of the main structure, ribs supporting an external casing of the main structure, a wheel mounted beneath the front portion of the main structure, two wheels mounted beneath the rear portion of said main structure, a motor carried within the front portion of the main structure and operating the wheel thereunder, for propulsion, and a lever connected to the front portion of the main structure for flexing the latter and varying the course of the vehicle, substantially as set forth.

In testimony that I claim the foregoing as my invention I affix my signature in presence of two witnesses.

THOMAS J. THORP.

Witnesses:
M. E. DAYTON,
TAYLOR E. BROWN.